(12) United States Patent
Ohhashi

(10) Patent No.: US 9,294,645 B2
(45) Date of Patent: Mar. 22, 2016

(54) IMAGE FORMING APPARATUS AND METHOD OF OPERATING IMAGE FORMING APPARATUS, CONFIGURED TO DETERMINE WHETHER OPERATING MODE IS EXECUTABLE BASED ON CHARGE REMAINING IN BATTERY

(71) Applicant: Kenichi Ohhashi, Kanagawa (JP)

(72) Inventor: Kenichi Ohhashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/558,861

(22) Filed: Dec. 3, 2014

(65) Prior Publication Data

US 2015/0172495 A1    Jun. 18, 2015

(30) Foreign Application Priority Data

Dec. 16, 2013 (JP) ................. 2013-259515

(51) Int. Cl.
| | |
|---|---|
| *G06K 15/02* | (2006.01) |
| *H04N 1/00* | (2006.01) |
| *G06K 15/00* | (2006.01) |
| *B41J 29/393* | (2006.01) |
| *B41J 29/13* | (2006.01) |
| *B41J 29/38* | (2006.01) |

(52) U.S. Cl.
CPC ............. *H04N 1/00899* (2013.01); *B41J 29/13* (2013.01); *B41J 29/38* (2013.01); *B41J 29/393* (2013.01); *G06K 15/4055* (2013.01); *H04N 1/00408* (2013.01); *H04N 2201/0094* (2013.01)

(58) Field of Classification Search
CPC .......... H04N 1/00885; H04N 1/00899; H04N 1/00408; H04N 2201/0094; G06K 15/005; G06K 15/4055

USPC ................ 358/1.1–3.29, 1.11–1.18
See application file for complete search history.

(56) References Cited

U.S. PATENT DOCUMENTS

| | | | | |
|---|---|---|---|---|
| 4,492,955 | A * | 1/1985 | Kubota ............ | G01R 19/16542 320/136 |
| 5,811,890 | A * | 9/1998 | Hamamoto ...................... | 307/66 |
| 7,880,908 | B2 * | 2/2011 | Suzuki .......................... | 358/1.14 |
| 8,519,716 | B2 * | 8/2013 | Kurata ............... | G01R 31/3624 320/118 |
| 2002/0033872 | A1 * | 3/2002 | Takahashi ...................... | 347/110 |
| 2013/0214603 | A1 * | 8/2013 | Tanaka ........................... | 307/66 |

FOREIGN PATENT DOCUMENTS

| | | |
|---|---|---|
| JP | 3-211473 | 9/1991 |
| JP | 2003-067174 | 3/2003 |
| JP | 2007-168237 | 7/2007 |

\* cited by examiner

*Primary Examiner* — Marcellus Augustin
(74) *Attorney, Agent, or Firm* — Cooper & Dunham LLP

(57) ABSTRACT

An image forming apparatus includes a voltage detector that detects voltage drop in battery output when the image forming apparatus enters operating mode, a table that stores data associating the entered operating mode with the voltage drop in battery output in performing the operating mode, a battery power detector that detects charge remaining on the battery, and an operating mode determination unit that determines whether or not the operating mode is executable based on the voltage drop in battery output in performing the operating mode. The operating mode determination unit determines whether or not the operating mode is executable based on the voltage drop in battery output in performing the operating mode acquired from the table and output voltage of the battery in accordance with the charge remaining on the battery.

7 Claims, 9 Drawing Sheets

| OPERATING MODE | COLOR SETTING | SPEED SETTING | DUPLEX SETTING | POWER CONSUMPTION (WH) | VOLTAGE DROP (V) |
|---|---|---|---|---|---|
| PRINT | B/W | HIGH SPEED | SINGLE SIDED | 0.015 | 0.30 |
| | | | DUPLEX | 0.018 | 0.40 |
| | | NORMAL | SINGLE SIDED | 0.025 | 0.20 |
| | | | DUPLEX | 0.028 | 0.25 |
| | | HIGH QUALITY | SINGLE SIDED | 0.035 | 0.15 |
| | | | DUPLEX | 0.037 | 0.19 |
| | COLOR | HIGH SPEED | SINGLE SIDED | 0.015 | 0.30 |
| | | | DUPLEX | 0.018 | 0.40 |
| | | NORMAL | SINGLE SIDED | 0.025 | 0.20 |
| | | | DUPLEX | 0.028 | 0.25 |
| | | HIGH QUALITY | SINGLE SIDED | 0.035 | 0.15 |
| | | | DUPLEX | 0.037 | 0.19 |
| COPY | B/W | HIGH SPEED | SINGLE SIDED | 0.015 | 0.30 |
| | | | DUPLEX | 0.018 | 0.40 |
| | | NORMAL | SINGLE SIDED | 0.025 | 0.20 |
| | | | DUPLEX | 0.028 | 0.25 |
| | | HIGH QUALITY | SINGLE SIDED | 0.035 | 0.15 |
| | | | DUPLEX | 0.037 | 0.19 |
| | COLOR | HIGH SPEED | SINGLE SIDED | 0.015 | 0.30 |
| | | | DUPLEX | 0.018 | 0.40 |
| | | NORMAL | SINGLE SIDED | 0.025 | 0.20 |
| | | | DUPLEX | 0.028 | 0.25 |
| | | HIGH QUALITY | SINGLE SIDED | 0.035 | 0.15 |
| | | | DUPLEX | 0.037 | 0.19 |

FIG. 9

| OPERATING MODE | COLOR SETTING | SPEED SETTING | DUPLEX SETTING | POWER CONSUMPTION (WH) | VOLTAGE DROP (V) |
|---|---|---|---|---|---|
| PRINT | B/W | HIGH SPEED | SINGLE SIDED | 0.015 | 0.30 |
| | | | DUPLEX | 0.018 | 0.40 |
| | | NORMAL | SINGLE SIDED | 0.025 | 0.20 |
| | | | DUPLEX | 0.028 | 0.25 |
| | | HIGH QUALITY | SINGLE SIDED | 0.035 | 0.15 |
| | | | DUPLEX | 0.037 | 0.19 |
| | COLOR | HIGH SPEED | SINGLE SIDED | 0.015 | 0.30 |
| | | | DUPLEX | 0.018 | 0.40 |
| | | NORMAL | SINGLE SIDED | 0.025 | 0.20 |
| | | | DUPLEX | 0.028 | 0.25 |
| | | HIGH QUALITY | SINGLE SIDED | 0.035 | 0.15 |
| | | | DUPLEX | 0.037 | 0.19 |
| COPY | B/W | HIGH SPEED | SINGLE SIDED | 0.015 | 0.30 |
| | | | DUPLEX | 0.018 | 0.40 |
| | | NORMAL | SINGLE SIDED | 0.025 | 0.20 |
| | | | DUPLEX | 0.028 | 0.25 |
| | | HIGH QUALITY | SINGLE SIDED | 0.035 | 0.15 |
| | | | DUPLEX | 0.037 | 0.19 |
| | COLOR | HIGH SPEED | SINGLE SIDED | 0.015 | 0.30 |
| | | | DUPLEX | 0.018 | 0.40 |
| | | NORMAL | SINGLE SIDED | 0.025 | 0.20 |
| | | | DUPLEX | 0.028 | 0.25 |
| | | HIGH QUALITY | SINGLE SIDED | 0.035 | 0.15 |
| | | | DUPLEX | 0.037 | 0.19 | ially configure executable

IMAGE FORMING APPARATUS AND METHOD OF OPERATING IMAGE FORMING APPARATUS, CONFIGURED TO DETERMINE WHETHER OPERATING MODE IS EXECUTABLE BASED ON CHARGE REMAINING IN BATTERY

CROSS-REFERENCE TO RELATED APPLICATION

This patent application is based on and claims priority pursuant to 35 U.S.C. §119(a) to Japanese Patent Application No, 2013-259515, filed on Dec. 16, 2013 in the Japan Patent Office, the entire disclosure of which is hereby incorporated by reference herein.

BACKGROUND

1. Technical Field

The present invention relates to an image forming apparatus and method of operating the image forming apparatus.

2. Background Art

Conventionally, in battery-powered apparatuses such as certain printers, it is known to detect the charge remaining on the battery so that failures such as stopping printing due to insufficient battery power do not occur.

In the conventional methods of detecting the charge remaining on the battery, the charge remaining is calculated by correcting for how much the battery voltage drops when current is drawn off, or by using the number of times the battery has been charged. However, since primary batteries and secondary batteries have different internal resistances depending on the type, the voltage drop that occurs when imposing a load varies.

Therefore, in the conventional printers described above, it is difficult to detect the charge remaining on the battery package accurately if different types of batteries are used for the battery package. As a result, there is a risk of problems occurring such as the printer stops operating or does not start operating.

SUMMARY

An example embodiment of the present invention provides a novel image forming apparatus that includes a voltage detector that detects voltage drop in battery output when the image forming apparatus enters operating mode, a table that stores data associating the entered operating mode with the voltage drop in the output in performing the operating mode, a battery power detector that detects charge remaining on the battery, and an operating mode determination unit that determines whether or not the operating mode is executable based on the voltage drop in the output in performing the operating mode.

Further example embodiments of the present invention provide a driving control method for the image forming apparatus.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 9 is a diagram illustrating a table that an ASIC uses for determining whether a particular operating mode can be executed.

DETAILED DESCRIPTION

Figure 1:
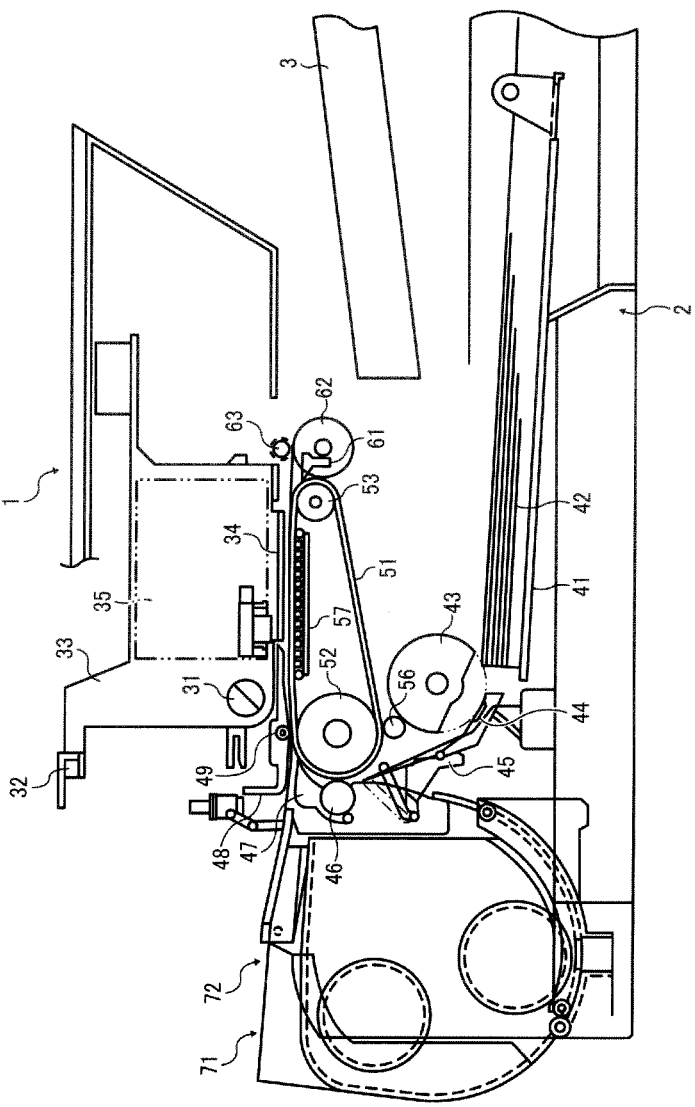
FIG. 1 is a diagram illustrating the overall mechanical configuration of a conventional inkjet recording apparatus.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the following embodiment, a novel image forming apparatus is provided, which can selectively configure executable modes in accordance with the type of batteries, the number of batteries, or the charge remaining on the batteries, thus preventing failures due to the insufficient battery power from occurring.

First, a configuration of an inkjet recording apparatus as an example of an image forming apparatus in this embodiment is described schematically below.

Figure 2:
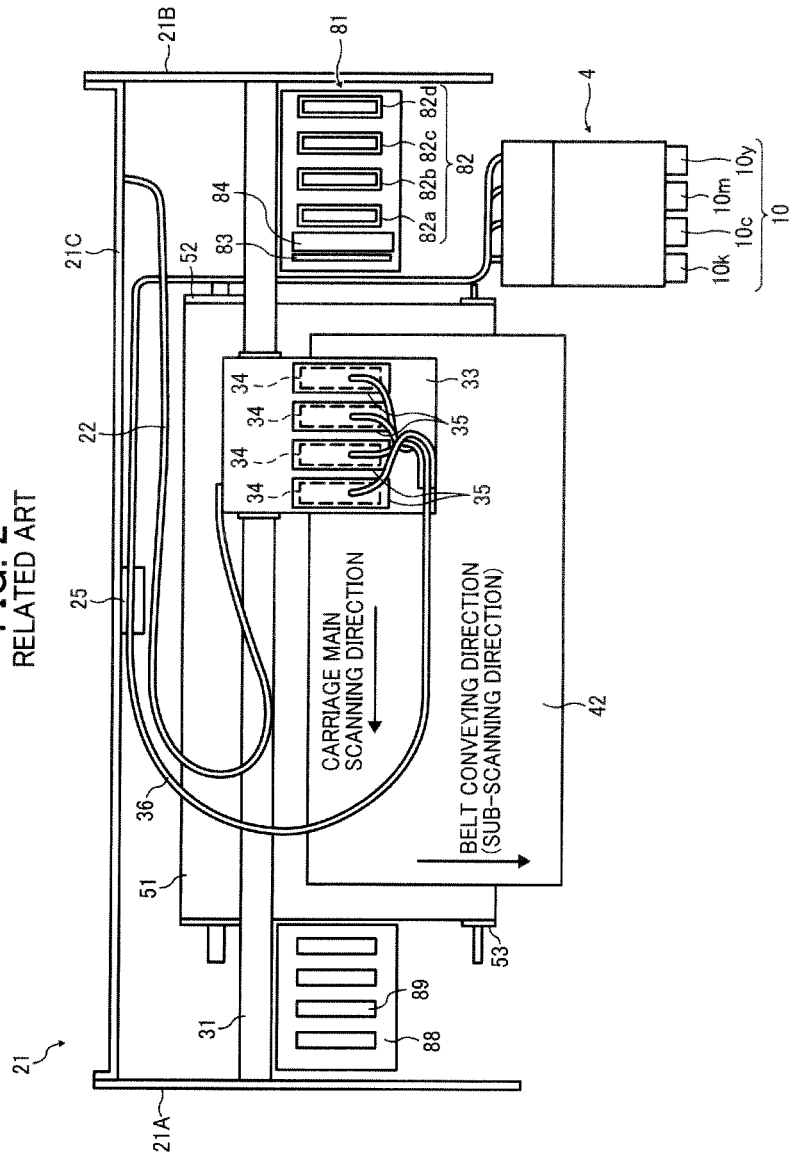
FIG. 2 is a diagram illustrating the chief components of the inkjet recording apparatus in FIG. 1.

FIG. 1 is a diagram illustrating the overall mechanical configuration of a conventional inkjet recording apparatus. FIG. 2 is a diagram illustrating the chief components of the inkjet recording apparatus in FIG. 1.

As shown in FIG. 1 and FIG. 2, a guide rod 31 as a guiding member is a lateral bridging that bridges a left side panel 21A and a right side panel 21B that consist of a frame 21 of the inkjet recording apparatus.

A carriage 33 is supported by the guide rod 31 and the stay 32 in the main scanning direction. The carriage 33 can move in the direction shown by the arrow in FIG. 2 (in the main scanning direction) driven by the main scanning motor 109(1) in FIG. 3 via a timing belt (not shown in figures).

In the carriage 33, four recording heads 34 that eject ink droplets in yellow (Y), cyan (C), magenta (M), and black (K) are mounted perpendicular to the main scanning direction, and a controller (not shown in figures) controls the ink droplets ejection of the recording heads 34. An inkjet head that comprises the recording head 34 includes a pressure generator that generates pressure to eject droplets, such as a piezoelectric actuator using a piezoelectric element, a thermal actuator that uses phase change by film boiling of liquid using an electro-thermal conversion element such as a heating resistor, a memory metal actuator that uses phase change of metal by temperature variation, and an electrostatic actuator that uses electrostatic force.

The recording head 34 can drive all ink ejection nozzles simultaneously, or the recording head 34 can drive the ink ejection nozzles using time-division.

In case of driving all ink ejection nozzles simultaneously, recording quality could deteriorates due to effect of crosstalk between all ink ejection nozzles, and large power supply could be needed since large current is needed temporarily in some cases.

By contrast, these issues described above can be prevented by driving the ink ejection nozzles using time-division.

The recording head 34 includes a driver IC, and the recording head 34 is connected to a controller (not shown in figures) via a harness 22 (a flexible printed cable).

The carriage 33 includes four sub-tanks 35 for supplying ink to each of the recording heads 34. Ink is supplied from ink cartridges 10 (10k, 10c, 10m, and 10y) loaded on a cartridge loading unit 4 to the corresponding sub-tank 35 via an ink feeding tube 36. The cartridge loading unit 4 includes a supplying pump unit for supplying ink in the ink cartridge 10. The ink feeding tube 36 is supported by a rear panel 21C that consists of the frame 21 using a locking member 25.

The paper feeding unit for feeding paper 42 from the paper feed tray 41 (pressure plate) includes a semicircle paper feed roller 43 for feeding the paper 42 loaded on a paper loading plate 41 one by one separately, a separating pad 44 located facing to the paper feed roller 43. The separating pad 44 is biased toward the side of the paper feed roller 43.

In order to transfer the paper 42 under the recording heads 34, there are a guiding member 45 that guides the paper 42, a counter roller 46, a carrying guide member 47, and a pressing member 48 that includes a head press roller 49.

The paper 42 fed from the paper feed unit sticks to the paper transferring belt 51 using electrostatic adsorption, and the paper 42 is transferred to the position facing to the recording heads 34.

The conveyance belt 51 is endless and entrained around a conveyance roller 52 and a tension roller 53. The conveyance belt 51 includes, for example, a surface layer as a paper adsorption surface formed with a pure resin material that is about 40 μm thick with no resistance control such as a material of pure ethylene-tetrafluoroethylene copolymer (ETFE) and a back surface layer (a middle resistance layer, an ground layer) whose material is the same as the surface layer with resistance control using carbon.

The inkjet recording apparatus in this embodiment includes a charging roller 56 as a charging unit that charges the surface of the conveyance belt 51. The charging roller 56 contacts the surface layer of the conveyance belt 51, and the charging roller 56 is mounted so that it is driven by the conveyance belt 51. Predetermined suppress strength is applied as suppressing force on both ends of the axis of the charging roller 56. The conveyance roller also functions as an ground roller. The conveyance roller 52 contacts the middle resistance layer (back surface layer), and the conveyance roller 52 is grounded. On the back side of the conveyance belt 51, a guiding member 57 is located in accordance with an image forming area by the recording head 34.

The guiding member 57 is mounted so that the upper surface of the guiding member 57 projects from tangent of two rollers (the conveyance roller 52 and the tension roller 53) that support the conveyance belt 51 to the side of the recording head 34, and the guiding member 57 maintains high-precision planarity of the conveyance belt 51.

Figure 3:
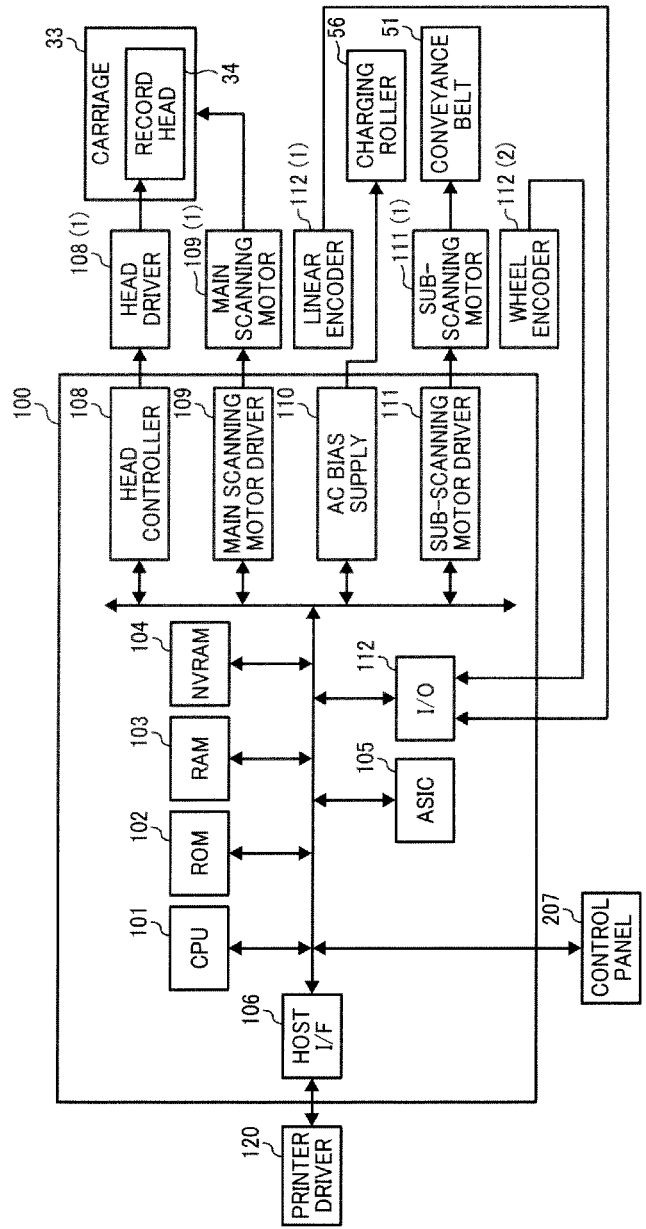
FIG. 3 is a block diagram illustrating a configuration of a controller used in the inkjet recording apparatus.

The conveyance belt 51 moves the paper 42 in the belt conveying direction shown in FIG. 2 (in the sub-scanning direction) by driving the conveyance roller 52 with a sub-scanning motor 111(1) in FIG. 3. The inkjet recording apparatus 1 in this embodiment further includes the paper ejection unit for ejecting the paper 42 after finishing recording using the recording head 34 that includes a separation claw 61 for separating the paper 42 from the conveyance belt 51, a paper ejection roller 62, and an ejecting roller 63, and the ejected paper 42 is placed in stock on the paper output tray 3 under the ejecting roller 62.

In addition, a removable duplex feeding unit 71 is mounted in the backside of the inkjet recording apparatus 1. The duplex feeding unit 71 fetches the paper 42 returned by the reverse rotation of the conveyance belt 51, turns over the paper 42, and feeds the paper 42 between the counter roller 46 and the conveyance belt 51 again. A bypass tray 72 is located over the duplex feeding unit 71. Furthermore, as shown in FIG. 2, in a non-print area on one side of the carriage 33 in the main scanning direction, there is a maintenance recovery unit 81 (a maintenance unit) for maintaining and recovering the nozzle status of the recording head 34. The maintenance unit 81 includes caps from 82a to 82d (also referred to as the cap 82 collectively) that cap the nozzle side of the recording head 34, a wiper blade 83 that wipes the nozzle side of the recording head 34, and a dummy-ejection receptacle 84 that receives droplets dummy-ejected to eject thickened recording liquid droplets that does not contribute to recording. In this case, the cap 82a is used for vacuuming and keeping the nozzles wet, and the caps 82b, 82c, and 82d are used for keeping the nozzles wet.

Waste recording liquid generated during maintenance by the maintenance unit 81, ink ejected onto the cap 82, ink attached to the wiper blade 83 and removed by the wiper cleaner, and ink dummy-ejected onto the dummy-ejection receptacle 84 are ejected and collected in a waste liquid tank (not shown in figures).

As shown in FIG. 2, in a non-print area on the other side of the carriage 33 in the main scanning direction, there is a dummy-ejection receptacle 88 that receives droplets dummy-ejected to eject viscous recording liquid droplets that does not contribute to recording, and the dummy-ejection receptacle 88 includes an opening 89 along with the nozzle row direction of the recording head 34.

Furthermore, there are a communication circuit (an interface) such as USB for transferring/receiving data to/from a host and a controller circuit board that consists of a controller that controls the entire the inkjet recording apparatus in this embodiment in the rear part inside the inkjet recording apparatus 1.

In the inkjet recording apparatus 1 configured as described above, the paper feeding unit conveys paper 42 one by one separately. The guide 45 guides the paper 42 conveyed substantially upward in the vertical direction, the paper 42 is conveyed between the conveyance belt 51 and the counter roller 46, the front edge of the paper 42 is guided by the conveyance guide 47 and pressed to the conveyance belt 51 by the pressing roller 49, and the paper 42 turns 90 degrees substantially.

At this point, a controller (not shown in figures) has an AC bias supply apply alternate voltage that repeats plus and minus voltages alternately to the charging roller 26 and charges the conveyance belt 51 in an alternating charged voltage pattern that repeats at predefined intervals in the sub-scanning direction (rotating direction). If the paper 42 is conveyed on the charged conveyance belt 51, the paper 42 is stuck to the conveyance belt 51 by electrostatic force and conveyed to the sub-scanning direction by rotation of the conveyance belt 51.

Subsequently, by driving the recording head 34 in accordance with an image signal moving the carriage 33 back and forth, one line is recorded by ejecting ink droplets on the still paper 42. After conveying the paper 42 at predefined distance, next line is recorded. After receiving a record finish signal or a signal that indicates that the rear edge of the paper 42 reaches at recording area, it finishes recording and ejects the paper 42 on the output tray 3.

The carriage 33 is moved to the side of the maintenance unit 81 while waiting for printing (recording), and the nozzle side of the recording head 34 is covered by the caps 82 to prevent ejection failure due to dried ink by keeping the nozzles wet. Also, a recovery operation is performed to eject viscous recording liquid and air bubbles by vacuuming recording liquid up from the nozzles using a vacuum pump (not shown in figures) while the recording head 34 is covered by the caps 82 (also referred to as "nozzle vacuuming" or "head vacuuming"). Furthermore, by performing the dummy ejection operation for ejecting thickened recording liquid timely. Consequently, stable discharging performance of the recording head 34 is maintained.

FIG. 3 is a block diagram illustrating a configuration of a controller 100 used in the conventional inkjet recording apparatus 1.

The controller 100 includes a Central Processing Unit (CPU) 101 that controls carrying the paper and moving the recording heads, a ROM 202 that stores programs executed by the CPU 101 and other fixed data, a RAM 103 that stores image data, etc. temporarily, a nonvolatile RAM (NVRAM) 104 that keeps data when the power is turned off and is rewritable, and an Application Specific Integrated Circuit (ASIC) 105 that performs various image processing operations such as various signal processing and sorting, etc., on the image data and processes input/output signals for controlling the entire the inkjet recording apparatus 1.

The controller 100 further includes a host I/F 106 that transmits/receives print data and signals from/to the host, a head controller 108 that generates driving data for driving the recording head 34 and output the image data and other data that drives a pressure generation unit in the recording head 34 selectively to a head driver 108(1), a main scanning motor driver 109 that drives a main scanning motor 109(1), an AC bias supplier 110 that applies AC bias to the charging roller 56, a sub-scanning motor driver 111 that drives a sub-scanning motor 111(1), and an I/O 112 (an input/output unit) that inputs detections pulses from a linear encoder 112(1) and a wheel encoder 112(2) and detection signals from other various sensors. In addition, the controller 100 is connected to the control panel 207 that inputs and displays data necessary for the apparatus.

The controller 100 receives print data etc. generated by a printer driver 120 in hosts such as information processing apparatuses such as personal computers, image scanning apparatuses such as image scanners, and image pickup apparatuses such as digital cameras using the host I/F 106 via cables and networks. The CPU 101 in the controller 100 reads and analyzes the print data stored in a receive buffer included in the host I/F 106, instructs the ASIC 105 to perform necessary image processing and data sorting process etc., and transfers it to the head controller 108. The head controller 108 outputs the image data and the driving waveform to the head driver 108(1) at predetermined timing. For example, dot pattern data for outputting image is generated by storing font data in the ROM 102.

Otherwise, it is possible that the printer driver in the host renders the image data as bitmap data and transfers it to the inkjet recording apparatus 1. In this case, the printer driver 120 generates the dot pattern data.

A driving waveform generator (not shown in figures) in the head controller 108 consists of a digital-analog convertor that performs digital-analog conversion on pattern data of a driving pulse stored in the ROM 102 and read by the CPU 101 and an amplifier etc. and outputs a drive waveform comprised of one drive pulse or multiple drive pulses to the head driver 108(1). The head driver 108(1) drives the recording head 34 by applying the drive pulse that comprises the drive waveform sent from the drive waveform generator in the head controller 108 based on image data (dot pattern data) corresponding to one line of the recording head 34 to the pressure generator in the recording head 34 selectively.

The head driver 108(1) includes a shift register (not shown in figures) that inputs a clock signal and serialized data as image data, a latch circuit (not shown in figures) that latches each register value of the shift register using the latch signal, a level shifter (not shown in figures) that converts the signal value output by the latch circuit, and the analog switch array (a switching unit) turned on and off by the output of the level shifter etc. By controlling turning on and off the analog switch array, the head driver 108(1) applies the predetermined drive pulse included in the drive waveform to the pressure generator in the recording head. Both the configuration and the function of the head driver 108 are well-known.

Figure 4:
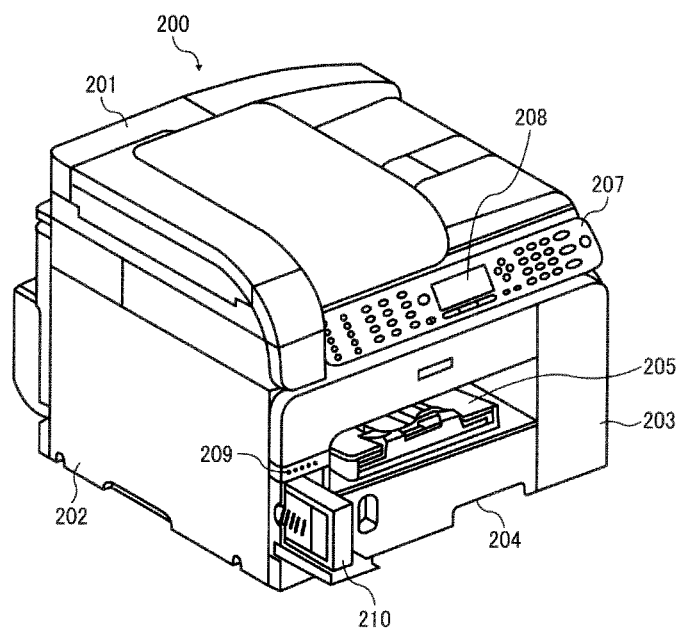
FIG. 4 is a diagram illustrating a multifunction peripheral (MFP) that includes the inkjet recording apparatus and can be operated with a battery.

FIG. 4 is a diagram illustrating a multifunction peripheral 200 (MFP) that includes the conventional inkjet recording apparatus described above and can be operated with a battery 210. The MFP 200 is described in detail below. However, it should be noted that the present invention is not limited to the MFP 200. The present invention can be implemented not only on the inkjet printing but also an MFP that includes an electrostatic recording printer and a copier, single-function printer, and single-function facsimile. In this case, the battery means both the primary battery and the secondary battery.

In this case, the MFP 200 includes a scanner unit 201 and a printer unit 202. In addition, the MFP 200 can include functions such as a copy function, print function, facsimile function, and a function of printing data stored in an external storage (e.g., a USB memory and a digital camera) directly. The MFP 200 includes space 203 where ink cartridges are inserted, a paper feed tray 204, a paper output tray 205 where paper is ejected after printing, a control panel 207 for operating the printer 202, and a liquid crystal panel 208 that indicates the status of the printer 202 etc. There are LEDs 209 for checking charge remaining on the battery 210 visually on the front surface of the machine.

Figure 5:
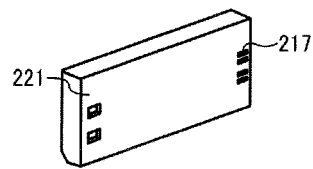
FIG. 5 is a diagram illustrating a battery pack for operating the MFP.

FIG. 5 is a diagram illustrating a battery pack 221 for operating the MFP 200.

Basically, it is presumed that a battery pack 221 dedicated to the apparatus (the MFP 200) is used. Power is supplied to the main unit of the printer 202 from terminals 217.

Figure 6:
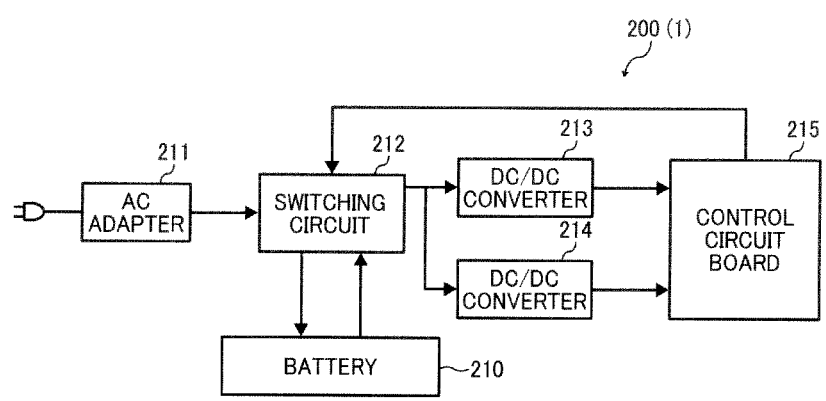
FIG. 6 is a block diagram illustrating a power controller in the MFP.

FIG. 6 is a block diagram illustrating a power controller 200(1) in the MFP 200.

As shown in FIG. 6, both the battery 210 and the AC adapter 211 are used for driving the printer 202 in the MFP 200 for example. The battery 210 consists of lithium-ion batteries or nickel-hydrogen batteries. The switching circuit 212 (control IC) that consists of a Field Effect Transistor (FET) and a control IC switches the power source from the AC adapter 211 to the battery 210 and vice versa.

The switching circuit 212 is controlled by the ASIC 105 shown in FIG. 3 and included in the controller board 215, and the switching circuit controls switching the power source and charging the battery 210. That is, the switching circuit 212 switches the power source from the AC adapter 211 to the battery 210 and vice versa. The DC/DC converters 213 and 214 generate DC voltage from a single power source supplied from a power source (either the AC adapter 211 or the battery 210) and supply the DC voltage used for the controller board 215, driving the head in the printer 202, and paper conveyance etc.

Figure 7A:
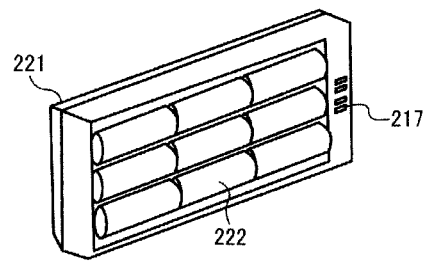
FIGS. 7A and 7B are diagrams illustrating the battery pack including batteries.
Figure 7B:
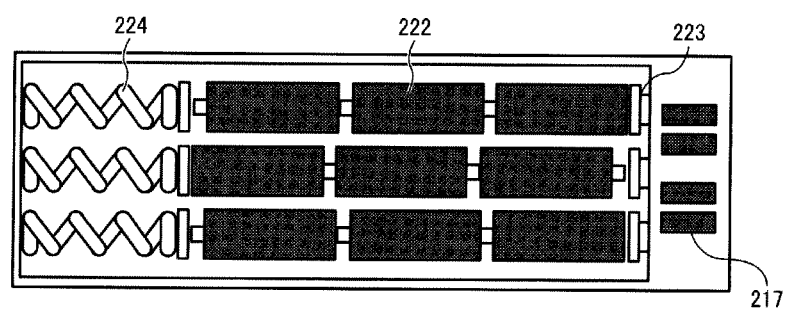

FIGS. 7A and 7B are diagrams illustrating the battery pack 221 (case) including battery cells 222 as the battery 210 in FIG. 6.

As shown in FIGS. 7A and 7B, the battery cells 222 are placed in the battery pack 221, and it is possible to select the type and the number of batteries and use the battery pack 221 as the replacement battery pack.

As shown in FIG. 7B, a spring terminal 224 for holding the battery cells 222 is used for an interface for connecting replacement batteries in the battery pack. In FIG. 7B, three battery cells 222 laid out serially are sandwiched between a fixed terminal 223 and the spring terminal 224. In this case, it is possible to determine the number of batteries arbitrarily by adjusting the number of battery rows. Several types of cases 221 are prepared, such as for D batteries and C batteries.

Figure 8:
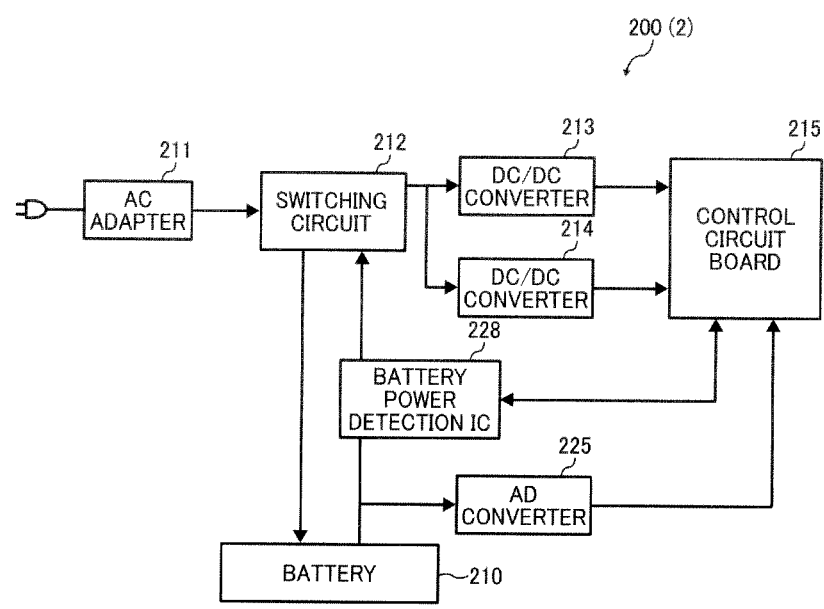
FIG. 8 is a block diagram illustrating the power controller in the MFP as an embodiment of the present invention.

FIG. 8 is a block diagram illustrating the power controller 200(2) in the MFP 200 in this embodiment.

As shown in FIG. 8, compared to the block diagram illustrating the power controller 200(1), an analog-digital converter 225 is inserted in parallel with the power line of the battery 210. As a result, the ASIC 105 can always monitor the output voltage of the battery 210. The ASIC 105 reads data that converts the output voltage of the battery 210 into digital value using the analog-digital converter 225. The ASIC 105 calculates the charge remaining by comparing the read voltage value with a table that associates voltage value with the charge stored in the ROM 102 in FIG. 3 preliminarily. Therefore, the analog-digital converter 225 and the ASIC 105 correspond to a voltage detector and a battery power detector in the present invention.

A battery power detection IC 228 connected to the output circuit of the battery 210 is described later. In addition, data that indicates relationship between the voltage value and the charge remaining is acquired preliminarily in accordance with the battery type and the number of batteries.

It is recorded that how much the voltage drops by operating the printer 202 arbitrarily (i.e., various operating modes that have different operation loads (power consumptions)) preliminarily. That is, of the size of the output voltage drop in the battery 210 when in various operating modes of the printer 202 are and stored in the table. In addition, the lowest voltage that the printer 202 can operate is measured and stored in the table in the ROM 102 preliminarily.

If the charge remaining on the battery 210 becomes lower than a predetermined value, a table (described later) shown in FIG. 9 referenced and it is determined whether or not the operating mode can operate accordingly. That is, the ASIC 105 determines that the operating mode that needs large amount of current that would drop the battery power to below the minimum voltage at which the printer 202 can operate is unavailable. The ASIC 105 calculates executable amount for each operating mode from power consumption (Wh) for each operating mode and the charge remaining. Therefore, the ASIC 105 functions as an operational mode determination unit in the present invention.

FIG. 9 is a diagram illustrating a table that the ASIC 105 uses for determining whether a particular operating mode can be executed.

As shown in FIG. 9, in the table, multiple pieces of power consumption (Wh) and voltage drop (V) are recorded in accordance with operating modes (print and copy), color settings (monochrome and color), speed settings (high speed, normal, low speed (high quality)), and single-sided and duplex.

As a result, the ASIC 105 determines which operating mode can be performed from the charge remaining voltage, and the ASIC 105 calculates how many sheets can be printed depending on the operating mode from the minimum voltage at which the printer 202 can operate and the charge remaining stored in the ROM 102 preliminarily. Therefore, the ASIC 105 also functions as an operation amount calculator in the present invention.

That is, for example, the ASIC 105 checks the voltage drop in case of driving the sub-scanning motor using the analog-digital converter 225 and compares the amount of voltage drop with the charge remaining on the battery 210. As a result, if the charge remaining on the battery 210 becomes lower than a predetermined value, operating modes with large operational load (voltage drop) such that the battery voltage becomes lower than the minimum voltage at which the printer 202 can operate, such as high-speed printing and paper feeding from the paper feed tray, etc., cannot be selected on a print setting screen (not shown in figures) of the printer driver 120. In this case, the ASIC 105 identifies the operating mode that cannot be performed (or selected) for each battery 210 in accordance with the charge remaining on the battery 210.

In this embodiment, the minimum voltage that the printer 202 can use is stored in the ROM 102 preliminarily, and the minimum voltage stored in the ROM 102 is compared with the value that the analog-digital convertor 225 converts into the voltage of the battery 210 and the voltage dropped in accordance with the operating mode. In this embodiment, it is possible to calculate the charge remaining on the battery more accurately by using the battery power detection IC 228 that can measure the precise amount of charge and the precise amount of discharge of the battery 210 and communicating with the ASIC 105 in the controller board via Inter-IC bus. As a result, the battery power detection IC 228 also functions as the battery power detector in the present invention.

Generally, commercially available batteries have large internal resistance, and show large voltage drops due to the rapid current change even if the battery has a large amount of the charge remaining. If the number of batteries has less margin compared to the voltage that the printer 202 can operate, the voltage drops below the minimum voltage when the printer 202 operates, and the printer 202 shuts down. By contrast, in this embodiment, since the operating mode that needs the rapid current that drops the minimum voltage at which the apparatus (printer 202) can operate is made unavailable preliminarily, it is possible to prevent unintentional shutdowns of the printer 202.

In addition, in case of setting operational amount such as the number of copies and the number of printed sheets, the ASIC 105 determines how many pages can be printed until the voltage drops below the minimum voltage of the printer 202, and the number of sheets is configured as the maximum number of sheets.

Figure 10:
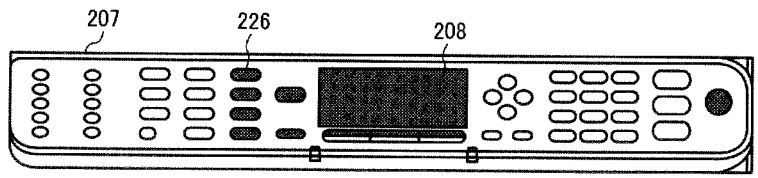
FIG. 10 is a diagram illustrating a control panel of the MFP.

FIG. 10 is a diagram illustrating the control panel 207 of the MFP 200.

As shown in FIG. 10, after determining the executable operating mode by detecting the charge remaining as described above, a message of inexecutable state ("Duplex copying cannot be performed. Paper feeding cannot be performed from the paper bank.") is displayed on the liquid crystal panel 208, operation start buttons 226 for starting facsimile operations and copy operations located on the control panel 207 cannot be operated, and a screen for configuring paper feeding method cannot be configured (e.g., operation on the operation start button 226 is considered as invalid. In addition, in case of performing copying, user configuration is limited to the upper limit of the number of sheets calculated preliminarily as described above.

Consequently, it is possible to select executable operations and the number of sheets only in accordance with the type of the battery 210 or the battery cells 222, the number of the battery 210 or the battery cells 222, and the charge remaining on the battery 210 or the battery cells 222.

Figure 11:
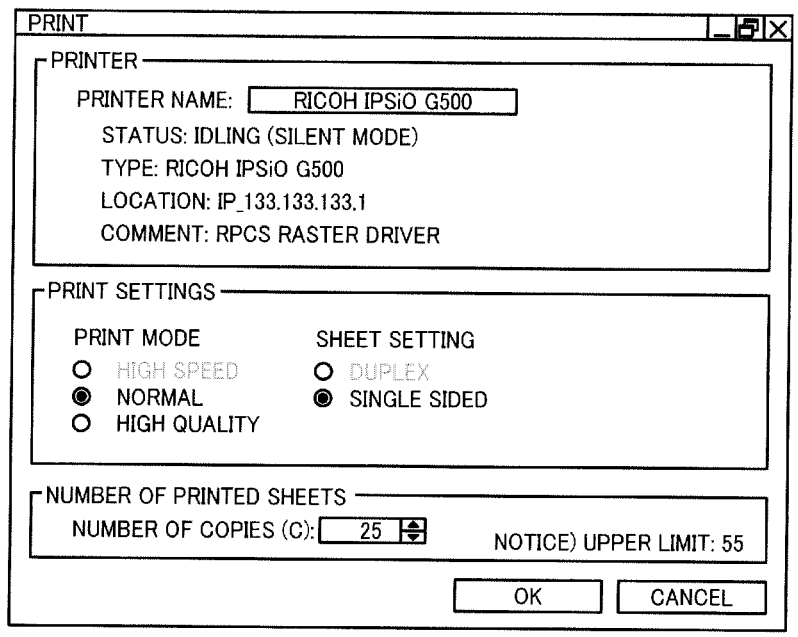
FIG. 11 is a diagram illustrating print settings of a printer driver in a personal computer (PC).

FIG. 11 is a diagram illustrating print settings of a printer driver 120 in the PC.

In this embodiment, as shown in FIG. 11, after determining the executable operating mode by detecting the charge remaining as described above, in case of configuring the print settings on the printer driver 120 in the PC, configurations on the inexecutable operations are grayed and cannot be selected. In FIG. 11, for example, "high speed" in print mode and "duplex" in sheet setting are grayed and cannot be selected. In addition, regarding the number of printed sheets, it is displayed that the upper limit of the number of sheets is 55 as a notice.

As described above, by preventing configuring the number of printed sheets over the upper limit value calculated preliminarily in the printer 202, it is possible to prevent selecting inexecutable configurations.

As described above, an operating mode setting prohibition unit that prohibits configuring inexecutable operating modes and an operational amount setting prohibition unit that prohibits configuring inexecutable operational amount are included in this embodiment.

The ASIC can include the operating mode setting prohibition unit and the operational amount setting prohibition unit. Otherwise, the operating mode setting prohibition unit and the operational amount setting prohibition unit can be implemented as function implementing units using a program by the CPU.

The operating mode setting prohibition unit and the operational amount setting prohibition unit perform the process that makes configurations on the control panel and the printer driver invalid as described above.

The present invention also encompasses a non-transitory recording medium storing a program that executes a driving control method for the image forming apparatus. The driving control method, performed by the image forming apparatus, includes the steps of detecting voltage drop in battery output when the image forming apparatus enters an operating mode, storing data in a memory associating the operating mode with the voltage drop in battery output in performing the operating mode, detecting charge remaining on the battery, and determining whether or not an operating mode is executable based on the detected charge remaining in the battery, using the data associating the operating mode with the voltage drop in battery output in performing the operating mode.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. A multi-function image forming apparatus having multiple image forming functions and operable with a battery, comprising:
   a voltage detector to detect voltage drop in battery output when the image forming apparatus enters an operating mode amongst plural candidate operating modes of different corresponding image forming functions;
   a memory to store, for each candidate mode amongst the plural candidate operating modes of corresponding image forming functions, predetermined voltage drop data associating the candidate mode with the voltage drop in battery output in performing the image forming function of the candidate mode;
   a battery power detector to detect charge remaining on the battery; and
   an operating mode determination unit to determine whether or not the operating mode is executable based on the detected charge remaining in the battery,
   wherein the operating mode determination unit compares the detected charge to a predetermined value, and if the detected charge is not lower than the predetermined value, the operating mode determination unit determines that the operating mode is executable, and if the detected charge is lower than the predetermined value, the operating mode determination unit references the predetermined voltage drop data associating the operating mode with the voltage drop in battery output in performing the image forming function of the operating mode to determine whether the operating mode is executable.

2. The image forming apparatus according to claim 1, wherein the operating mode determination unit obtains output voltage of the battery to detect the charge remaining on the battery.

3. The image forming apparatus according to claim 1, further comprising an operational amount calculator to calculate operational amount in the operating mode that the operating mode determination unit determines as executable based on the charge remaining on the battery.

4. The image forming apparatus according to claim 3, further comprising:
   a display unit to display the operational amount; and
   an operational amount configuration prohibition unit to prohibit configuring operational amount larger than the operational amount.

5. The image forming apparatus according to claim 1, further comprising: an alternative battery connecting interface for an interchangeable battery pack.

6. The image forming apparatus according to claim 1, further comprising:
   a display unit to display a message that the operating mode determination unit identifies the operating mode as inexecutable; and
   an operating mode configuration prohibition unit to prohibit configuring the inexecutable operating mode.

7. A method of operating a battery-powered image forming apparatus having multiple image forming functions, comprising the steps of:

(a) detecting voltage drop in battery output when the image forming apparatus enters an operating mode amongst plural candidate operating modes of different corresponding image forming functions;

(b) storing, in a memory and for each candidate mode amongst the plural candidate operating modes of different corresponding image forming functions, predetermined voltage drop data associating the candidate mode with the voltage drop in battery output in performing the image forming function of the candidate mode;

(c) detecting charge remaining on the battery;

(d) comparing the detected charge remaining in the battery to a predetermined value; and (e) determining whether or not the operating mode is executable based on the detected charge remaining in the battery, wherein if the detected charge is not lower than the predetermined value, it is determined in (e) that the operating mode is executable, and if the detected charge is lower than the predetermined value, the predetermined voltage drop data associating the operating mode with the voltage drop in battery output in performing the image forming function of the operating mode is referenced to determine whether the image forming function of the operating mode is executable.

* * * * *